United States Patent [19]

Lessi et al.

[11] Patent Number: 5,038,108

[45] Date of Patent: Aug. 6, 1991

[54] DETERMING PARAMETERS OF A GEOLOGICAL ENVIRONMENT

[75] Inventors: Jacques Lessi, Maule; Christian Wittrisch, Rueil-Malmaison, both of France

[73] Assignee: Institut Francais du Petrole, Rueil Malmaison, France

[21] Appl. No.: 299,314

[22] Filed: Jan. 23, 1989

[30] Foreign Application Priority Data

Jan. 22, 1988 [FR] France ............................. 88 00829

[51] Int. Cl.$^5$ .............................................. G01V 3/20
[52] U.S. Cl. .................................. 324/355; 324/366; 166/250; 175/50
[58] Field of Search ................. 324/354–360, 324/366–375, 363; 175/50; 166/250

[56] References Cited

U.S. PATENT DOCUMENTS

| | | | |
|---|---|---|---|
| 3,838,335 | 9/1974 | Miller | 324/366 |
| 4,278,942 | 7/1981 | Bonnet et al. | 324/366 X |
| 4,296,379 | 10/1981 | Yoshizumi | 324/366 X |
| 4,335,353 | 6/1982 | Lacour-Gayet | 324/366 |
| 4,601,353 | 7/1986 | Schuh et al. | 175/45 |
| 4,646,026 | 2/1987 | Chemali et al. | 324/366 X |

FOREIGN PATENT DOCUMENTS

| | | |
|---|---|---|
| 2501777 | 9/1982 | France . |
| 2522059 | 8/1983 | France . |
| 2547861 | 12/1984 | France . |
| 2564893 | 11/1985 | France . |
| 2146127 | 4/1985 | United Kingdom . |

Primary Examiner—Kenneth A. Wieder
Assistant Examiner—Warren S. Edmonds
Attorney, Agent, or Firm—Antonelli, Terry, Stout & Kraus

[57] ABSTRACT

A method of determining parameters of a geological environment having a known electrical resistivity $R_h$, with a heterogeneity in the environment having an electrical resistivity $R_e$, and with a borehole extending into either the environment or the heterogeneity at an unknown distance p from the interface between the environment and the heterogeneity. A measuring assembly is extended into the borehole, including an electrical emitter and two or more electrical detectors. Electrical energy is applied to the emitter and detected by one of the detectors at a distance d from the emitter, and the borehole resistivity $R_a$ at the distance d is determined. This is repeated for others of the detectors at other distances d. A curve is plotted of the resistivity ratio $R_a/R_h$ as a function of the distance d. The plotted curve is compared with previously obtained curves of the resistivity ratio $R_a/R_h$ as a function of d for various combinations of the values of the resistivity ratio $R_h/R_e$ and the borehole-interface distance p, and a resistivity ratio $R_h/R_e$ and a borehole-interface distance p are determined for the plotted curve. The resistivity $R_e$ of the heterogeneity is then calculated. The location of the heterogeneity can be determined from the distance p, and the nature of the heterogeneity is indicated by its resistivity $R_e$.

12 Claims, 5 Drawing Sheets

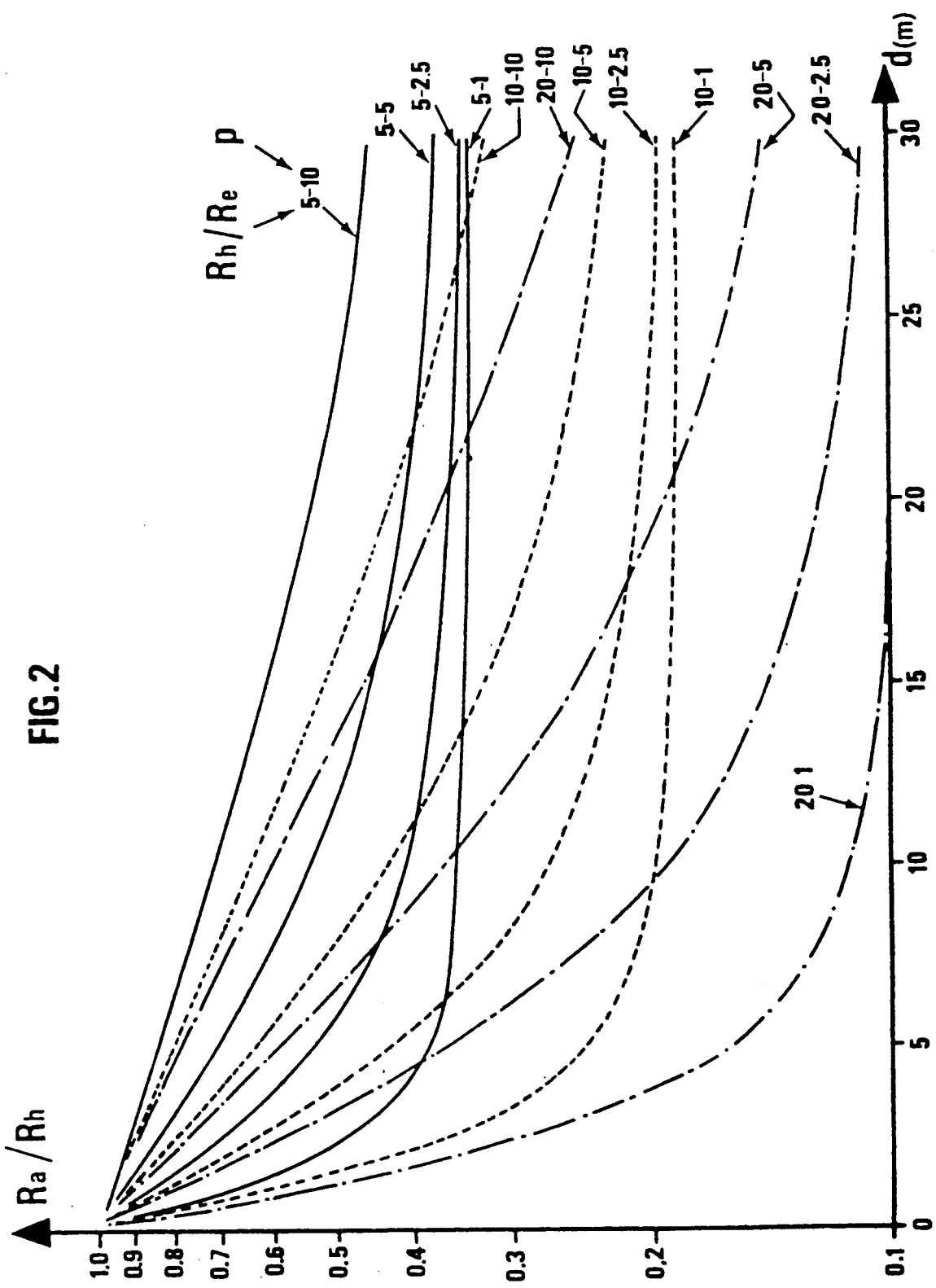

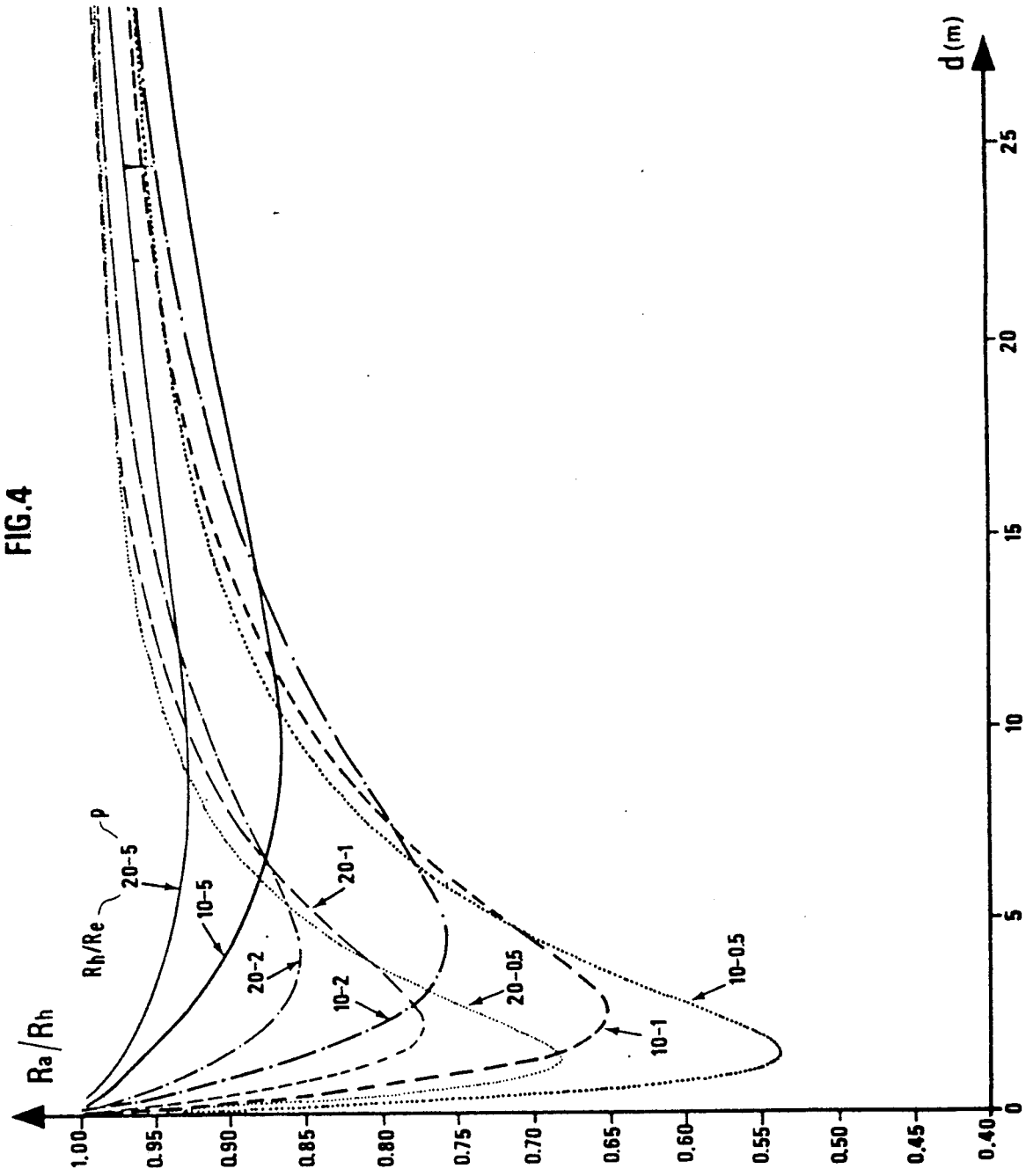

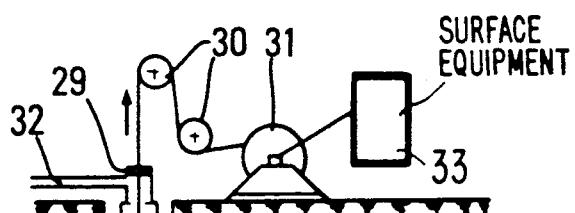
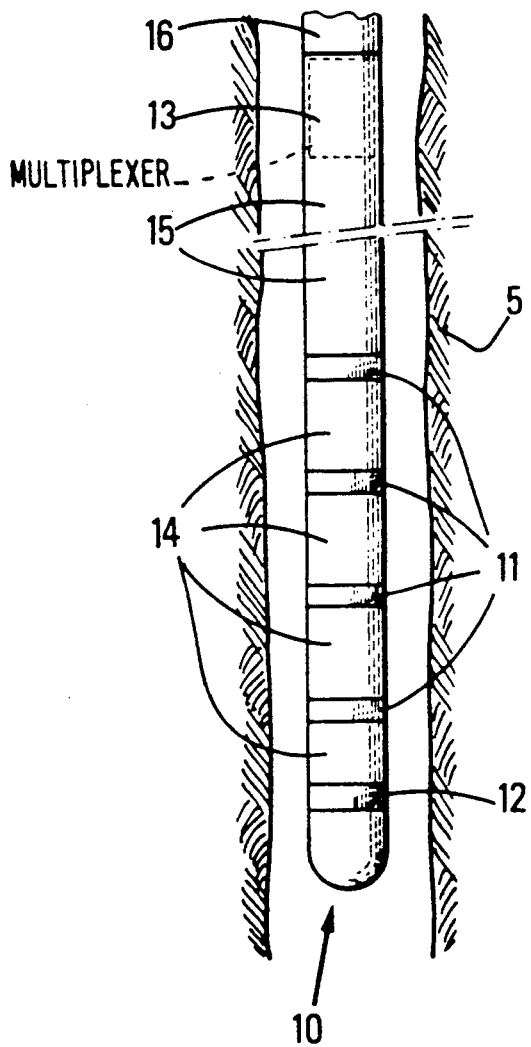

DETERMINING PARAMETERS OF A GEOLOGICAL ENVIRONMENT

BACKGROUND OF THE INVENTION

The present invention relates to a method and a device for determining, from a borehole in a geological environment having at least one heterogeneity, one or more parameters linked to one or more characteristics of the environment or the heterogeneity, such as resistivity, and at least one dimensional parameter, such as the distance between the borehole and the interface of the environment with the heterogeneity.

The invention applies in particular to detecting the stratigraphic beds of an oil reservoir from a borehole. The stratigraphic beds may be a roof, or an intercalated bed, or the interfaces between fluids such as the oil-water interface above or below the borehole.

The evolution in these characteristic dimensional parameters, which are extremely important for hydrocarbon production, allows the following, for example: by tracing the roof and wall, determining the thickness of the reservoir and estimating the reserves there; by tracing an intercalated bed, estimating the hydraulic communication between two parts of the reservoir; by detecting the argillaceous lens, protecting against the cone effect (generally called coning) of water or gas by perforating the pipes and producing the hydrocarbons above or below an argillaceous lens; by tracing the interfaces during production, optimizing production by evolving selective completion; by tracing various geological levels, measurement while drilling and choosing the direction of drilling for optimum positioning.

U.S. Pat. No. 3,838,335 teaches a method and a device for determining the presence of and distance to a heterogeneity from a ratio of electrical resistivities. This method applies in vertical wells, for which the heterogeneity being investigated is an interface perpendicular to the well axis. The method consists of processing the difference in potential between two measuring electrodes on either side of and equidistant from an injection electrode. The evolution in this potential difference as a function of the descent into the well allows the distance separating the well bottom from the heterogeneity investigated to be determined by reading from a system of curves.

Over the last decade, drilling techniques have evolved considerably, particularly the techniques linked to horizontal drilling where it is possible to traverse greater distances across reservoirs, thus obtaining a better picture of the reservoir from the measurements and samples collected in the wells.

At the present time, numerous studies are under way to examine the specific conditions of applications in horizontal wells, and such problems often present difficulties due to the structure and geometry of such wells.

Thus, in the present case where the goal is to obtain a method for determining a parameter linked to one or more characteristics of the environment or the heterogeneity, such as resistivity, and a distance, such as the distance between the borehole and the interface between the environment and the heterogeneity, knowledge of the record specified does not allow an effective method of determination to be obtained. Indeed, when used in a horizontal well, this method is inoperative.

When the heterogeneity investigated is more or less parallel to the well axis, when the emitter is positioned such that it is equidistant between the two receivers, there is no longer any difference in potential between the two measuring electrodes because they are at the same distance from the heterogeneity.

Moreover, the potential difference will be zero whatever the position of the tool in the well.

In addition, the apparatus proposed by U.S. Pat. No. 3,838,335 is obviously based on the use of a cable, which cannot be used in horizontal drilling.

SUMMARY OF THE INVENTION

The basic idea of the present invention is to provide a multi-spacing device between the emitter and the receiver, whereby the resistivity and distance-from-interface parameters are obtained by reading from a system of curves calculated by causing the distance between the injection electrode and the measuring electrode to vary.

The invention provides a method of determining, in a geological environment having at least one heterogeneity, at least one parameter characterizing the environment or heterogeneity, and at least one dimensional parameter p of the environment or the heterogeneity, characterized by a measuring assembly being lowered to the bottom of a well, which assembly has at least one emitter cooperating with at least two detectors disposed substantially in a straight line, each detector being at a greater distance from said emitter than the last detector along said straight line, such that, to make a measurement, the emitter is associated with one detector, which is at a given distance d from the emitter; the measuring assembly then furnishes at least one value of a parameter characteristic for said distance d; the method is implemented in the following stages:

a characteristic application of the physical phenomenon associated with the characteristic parameters used is defined, whereby this application defines a relationship between said emitter-receiver distance d, the value of said measured characteristic parameter, said dimensional parameter p of the medium or the heterogeneity, and said characteristic parameter of the medium or the heterogeneity, and one or more combined parameters of said dimensional parameters, characteristic parameters of the environment of the heterogeneity, and said distance d or said measured value, the evolution of the various parameters, values, and distances linked by said application are represented by theoretical simulation prior to measurement, initially, one of said dimensional parameters, a characteristic of the environment a characteristic of the heterogeneity, and/or a combined parameter of these dimensional parameters and characteristics, is/are measured, a characteristic value is then measured with said measuring assembly, regardless of its position in the well for a given emitter-receiver distance d, and by means of said characteristic or dimensional parameter initially measured, of said characteristic measured value and said emitter-receiver distance d associated with said measured characteristic value or several combined parameters of said measured characteristic parameter, of said measured value and said associated distance d, by identification form the evolution of said application represented by theoretical simulation, the unknown dimensional parameters or characteristic parameters of the environment or the heterogeneity characteristic, and said unknown combined parameters, are determined.

According to a particular embodiment of the invention, where the physical phenomenon linked to the measurements is a perturbation in the electrical field, when the characteristic parameters are electrical resistivities, the evolution in the electrical resistivities of the environment $R_h$, the heterogeneity $R_e$, and the measured resistivity $R_a$ for a given emitter-receiver distance d in the case of various dimensional parameters p of the environment with respect to the heterogeneity are represented by theoretical simulation prior to measurement, the electrical resistivity of the environment or the heterogeneity is initially measured, then, using said measuring assembly placed at the bottom of the well essentially in parallel with said heterogeneity, a resistivity value $R_a$ is measured for a given emitter-receiver distance, the dimensional parameters, the resistivity of the environment or the heterogeneity, and/or the unknown parameters combined, is/are determined.

Advantageously, the configuration of said heterogeneity with respect to the geological environment is identified prior to measurement.

According to a particular characteristic, two combined parameters are used, the first combined parameter $R_a/R_h$ being the ratio between said characteristic measured value $R_a$ and the parameter characterizting the environment $R_h$, the second combined parameter $R_h/R_e$ being the ratio between said parameter characterizing the environment $R_h$ and said parameter characterizing the heterogeneity $R_e$, whereby the first combined parameter corresponds to an anomaly of the characteristic parameter and the second combined parameter corresponds to a contrast in the characteristic parameter.

Advantageously, the resistivity of the environment or the resistivity of the heterogeneity is initially measured by means of said measuring assembly.

In a method of operation particularly suited for this method, the characteristic parameters are determined with the aid of said resistivity measurements by means of said measuring assembly in such a way as to guide the direction of drilling in the geological formations.

The present invention also includes an assembly for measuring a characteristic parameter for implementing the method of determination as described hereinabove, characterized by the element measuring a characteristic parameter for implementation of the method of determination, characterized by the measuring element having at least one emitter cooperating with at least two detectors disposed essentially in a straight line, each detector having, in said line, an increasing distance from said emitter, said emitter and said detectors being mounted on a rigid string of rods and insulator lowered to the bottom of a well whose bottom zone is essentially parallel to said heterogeneity.

Advantageously, the measuring assembly has at least one emitter and at least one detector as well as one supplementary emitter or detector which are designed to allow measurements for different emitter-receiver distances.

According to one advantageous characteristic of the invention, the detectors are separated from each other by a distance of essentially 10 cm over a length of the string of rods of approximately 10 meters.

BRIEF DESCRIPTION OF THE DRAWINGS

The invention will be understood by reading the description of embodiments illustrated by the attached drawings wherein:

FIG. 2 is a graphical representation of the evolution in the characteristic dimensional parameters of the environment and the heterogeneity and the emitter-detector distance in the configuration of FIG. 1, FIG. 7 shows the measuring assembly according to the invention which allows implementation of the method according to the invention, and FIG. 8 shows a method for utilizing the measuring assembly according to the invention.

DESCRIPTION OF PREFERRED EMBODIMENTS

Figure 1:
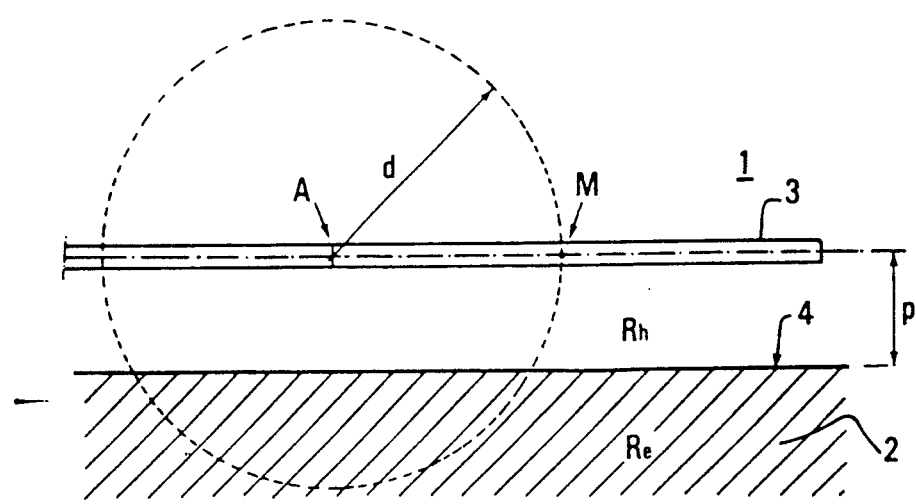
FIG. 1 represents a geological formation having a simple interface between an environment and a heterogeneity, whereby the borehole passes through the environment.

In FIG. 1, which shows a geological formation schematically, reference 1 designates an environment traversed by a borehole 3 such as a well or a drain. A heterogeneity 2 is located at one end of this environment.

In the case where the invention is, for example, applied to oil production, environment 1 may be an oil-bearing rock and heterogeneity 2 may be this same rock, but containing water.

Heterogeneity 2, which may be located either to the side of, above, or below environment 1, defines an interface 4 with the latter which does not intersect the borehole in the detection zone of the measuring assembly located in borehole 3.

The measuring assembly has one emitter A and at least a plurality of detectors M, located essentially in a straight line near each other, each detector being at an increasing distance from said emitter along said straight line.

The purpose of the measuring assembly is to obtain a characteristic parameter showing a contrast between the environment and the heterogeneity in order to distinguish the environment from the heterogeneity. The distance between borehole 3 and heterogeneity 2 or its interface with the environment is called p.

Figure 3:
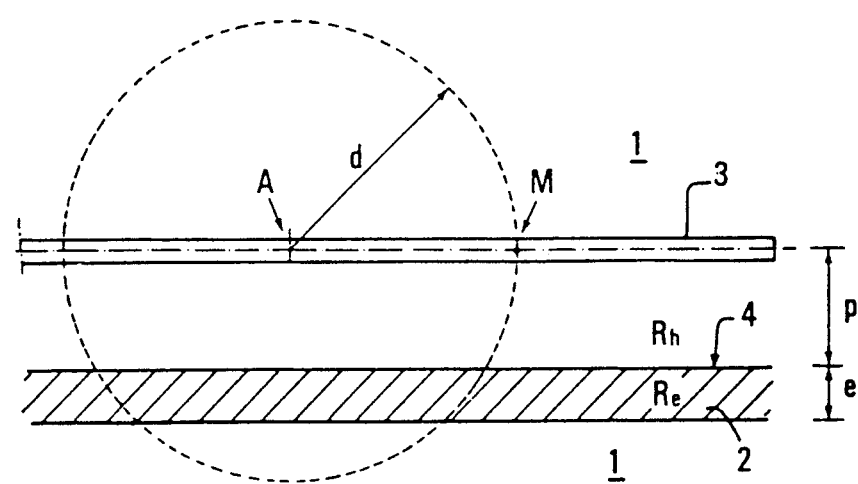
FIG. 3 shows schematically a geological formation having an intercalated bed (heterogeneity) in an environment through which the borehole passes, FIG. 4 illustratres the evolution in the parameters of the dimensional characteristic of the environment and the heterogeneity, and the emitter-detector distance, in the configuration of FIG. 3.
Figure 5:
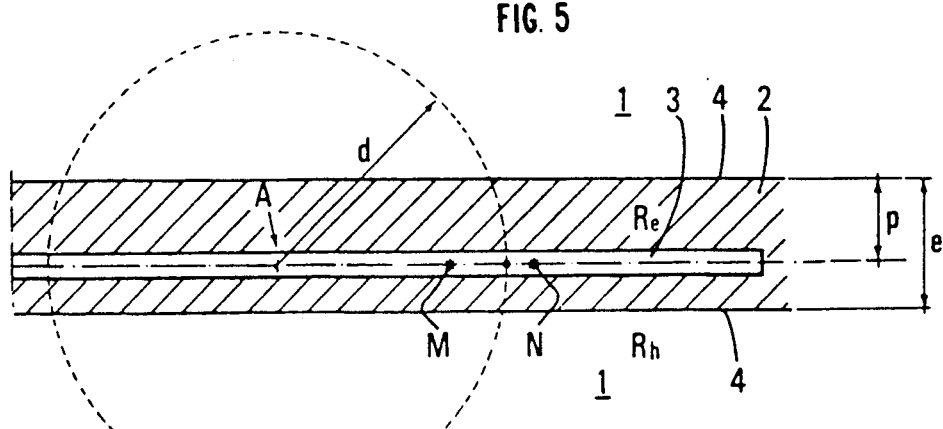
FIG. 5 shows schematically a geological formation having a heterogeneity inside which is a borehole.
Figure 6:
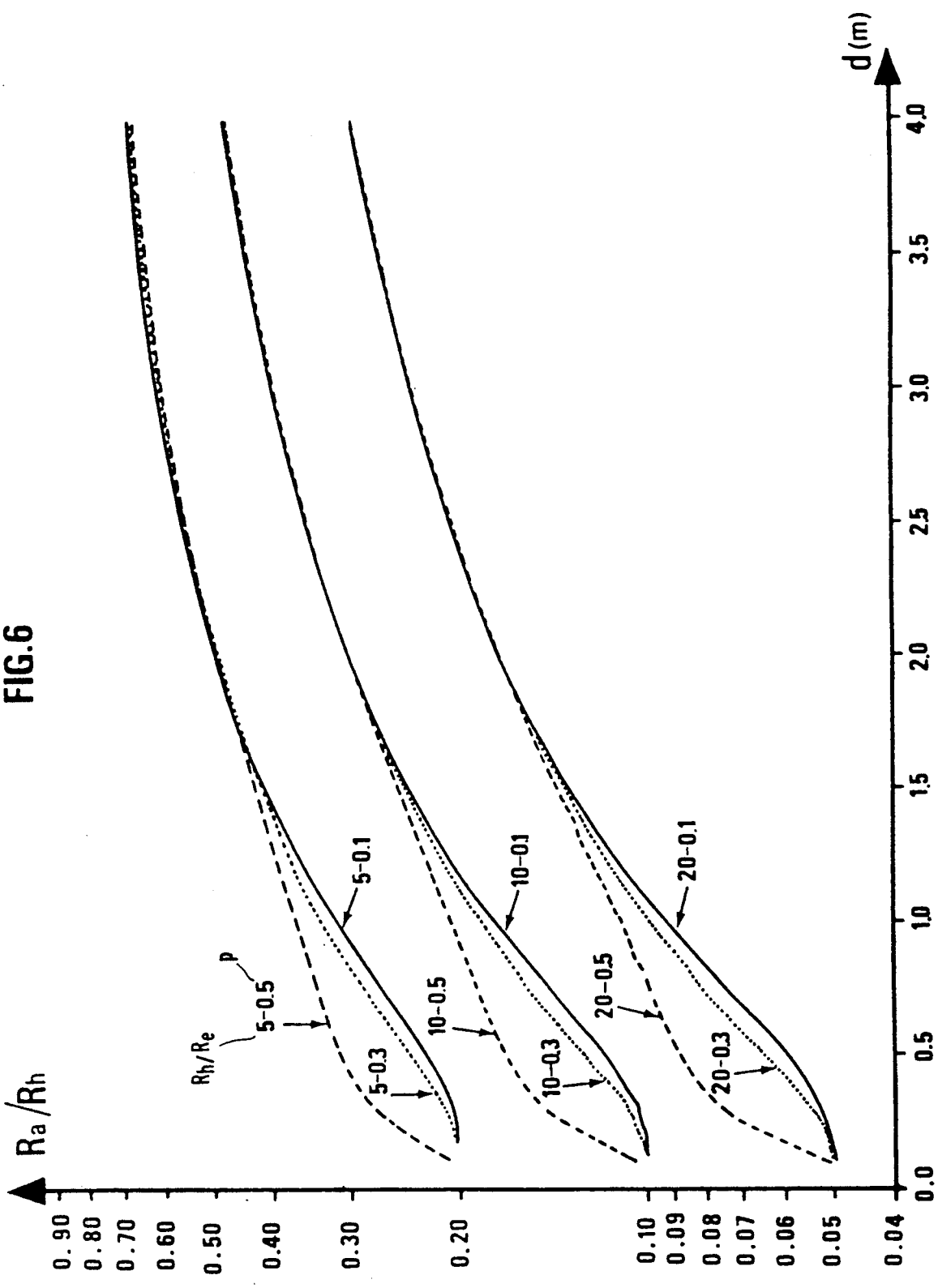
FIG. 6 shows the evolution in the parameters of the dimensional characteristic of the environment and the heterogeneity and the emitter-detector distance, in the configuration of FIG. 5.

In the graphs of FIGS. 2, 4, and 6, the characteristic parameter is electrical resistivity and the measuring assembly, as shown in FIGS. 1, 3, and 5, respectively allows this parameter to be calculated.

The various curves (FIGS. 2, 4, 6) were obtained previously by theoretical calculation, assuming point injection of current from emitter A, a zero electrical potential "at infinity", an axially symmetrical distribution of the current (distribution with cylindrical symmetry, whose axis passing through emitter A is perpendicular to interface A), and conservation of the electrical current.

The curves shown in FIG. 2 show the simultaneous evolution of the measurable or apparent value $R_a$ of the resistivity related to the resistivity $R_h$ of the environment, for various distances p between the heterogeneity and the borehole, and for various resistivity ratios $R_h/R_e$ (ratio between resistivity of environment to resistivity of heterogeneity) as a function of the distance d between the emitter and the detector.

The various curves are referenced by the juxtaposition of two numbers separated by a hyphen. The first number (on the left) relates to the ratio in resistivity between the environment and the heterogeneity $R_h/R_e$, and the second number (on the right) relates to a dimensional parameter expressed in meters.

In FIGS. 1 and 2, this dimensional parameter p corresponds to the space between borehole 3 and heterogeneity 2.

The system of curves does indeed show that the measured value of resistivity $R_a$ as a function of the resistivity of the environment $R_h$ depends on at least two independent parameters $R_h/R_e$ and p and shows that, once a curve of measured resistivity values $R_a$ as a function of emitter-detector distance d has been plotted, the two parameters $R_h/R_e$ and p can be determined.

The value of the apparent normal resistivity is calculated, as for all measuring assemblies performing normal measurements, from the potential measured by a detector M with respect to the potential at infinity, for a given current intensity going through emitter A.

Measuring principle

For different distances d between emitter A and detector M, the resistivity $R_a$ is measured, the resistivity of the environment $R_h$ is determined, and the various measured values $R_a$ relating to resistivity of the environment $R_h$ as a function of emitter-detector distance d are plotted in FIG. 2 (obtained previously by theoretical simulation).

Once the measured points have been entered in FIG. 2, the curve passing through these points is drawn. Then, from the system of curves obtained by simulation, superimposition, interpolation, or extrapolation of the ratio of resistivities $R_h/R_e$ and of the distance p between the heterogeneity and the borehole of these simulated curves, the ratio $R_h/R_e$ and the distance p for this curve comprising these measured points are identified.

The measuring curve could be identified by using various types of transparent or tracing materials on each of which is drawn some of the system of simulated curves for which just one of the parameters varies.

For example, on transparencies to be superimposed on the measuring curve, one might represent the changes in the measurable value as a function of the emitter-detector distance d for various distances p between the heterogeneity and the borehole, assuming for each of the transparencies a ratio resistivity contrast $R_h/R_e$.

One could also represent the changes in the measurable value as a function of emitter-detector distance d for various ratios in resistivity $R_h/R_e$, assuming for each of the transparencies that the distance p between the heterogeneity and the borehole remains constant.

FIG. 3 schematically shows a geological formation with an environment 1 which may contain oil and whose resistivity is $R_h$. This environment has a borehole 3 in which the measuring assembly is placed. This borehole is located at a distance p from a plane intercalated bed or heterogeneity 2, essentially parallel to borehole 3 and having a thickness e. On the side of intercalated bed 2 opposite borehole 3 environment 1 continues the resistivity of the intercalated bed or heterogeneity 2 is $R_e$, and the value of the resistivity measured by detector M when emitter A, separated from the detector by a distance d, injects pointwise a current, is $R_a$.

FIG. 4 illustrates the simulated evolution of the measured value of resistivity $R_a$ in a geological formation such as that illustrated in FIG. 3 as a function of the distance d between the emitter and the detector, and the distance p between borehole 3 and intercalated bed 2, for a resistivity ratios $R_h/R_e$ between environment 1 and heterogeneity 2 equal to ten and twenty, and for a variable thickness e of intercalated bed 2.

As in FIG. 2, the curves are referenced by two numbers separated by a hyphen. The first of these numbers designates the resistivity ratio $R_h/R_e$ between the environment and the heterogeneity, while the second designates the distance p separating borehole 3 from intercalated bed 2.

Using the same method employed in FIG. 2 to determine the resistivity ratio $R_h/R_e$ and distance p, FIG. 4 is used to determine these same unknowns in the case of a geological formation having an intercalated bed as in FIG. 3. However, with a normal resistivity measuring sonde with no current focusing, it is difficult, particularly in practice, to define the resistivity ratio $R_h/R_e$ when the thickness e of the intercalated bed is unknown, or to define the thickness e of the intercalated bed when the resistivity ratio is unknown. The electric current is focused by focusing electrodes and allows the current lines to be focused in the vicinity of the emitter. In this way, only a portion of the space is reached by these lines, and the information obtained from the detector is selective. In the absence of focusing, the emitter injects the current into the neighboring formations in a near-spherical manner.

For example, for a are resistivity ratio of 20 and an intercalated bed thickness of 0.5 meter, almost the same curve is obtained by simulation as with a resistivity ratio of 10 and an intercalated bed thickness of 1 meter.

FIG. 5 shows schematically a geological formation having an environment 1 located on either side of a heterogeneity or intercalated bed 2 in which is located a borehole 3 whose axis is essentially parallel to interface of the intercalated bed.

Borehole 3 contains a lateral measuring assembly designed to measure the apparent lateral resistivity value. This measuring assembly has a current emitter A and a detector, having two electrodes M and N located at an average distance d from the emitter.

The value of the apparent lateral resistivity is calculated from the difference in potential between the two electrodes M and N. With such a measuring assembly, the formations measured tend to extend laterally.

This geometric arrangement of the borehole in an intercalated bed like those represented in FIGS. 1 and 3 is characteristic of the arrangements in which measurements are made to permit drilling to progress.

FIG. 6 illustrates the simulation of the evolution in the apparent resistivity value $R_a$ related to resistivity $R_h$ of environment 1, as a function of the emitter-detector distance d associated with the apparent value $R_a$ for an intercalated bed thickness e established arbitrarily at one meter, a resistivity ratio $R_h/R_e$ and a distance p between the borehole and the environment that are variable. Even with a lateral measuring assembly, it is not possible to distinguish upper interface 4 from lower interface 4.

The curves shown in FIG. 6 are obtained with a 10 cm gap between electrodes M and N. It is well known to the individual skilled in the art that this gap can be adapted to the configurations of the formations. This evolution can be simulated for other gaps in the same was as was simulated the evolution in the apparent resistivity value $R_a$ related to the resistivity of the environment $R_h$ as a function of emitter-detector distance d with a 10 cm gap between electrodes M and N. Distinction between the interfaces is not always necessary, since in general the dip measurements of the intercalated beds are known and devices exist allowing the deflection of drilling to be continuously controlled, for example by measuring with magnetometers and accelerometers as the drilling progresses the parameters azimuth (the angle between the vertical plane containing the drilling string and the vertical plane containing the drilling direction) and inclination (the angle between the axis of the string and the horizontal plane), and their variation.

Likewise, as drilling advances and deflections are imposed on the drill bit to guide drilling, it is possible to monitor the evolution in the measured resistivity values to find out whether the direction of drilling continues to be correct.

As before, each of the curves in FIG. 6 is referenced by a first number corresponding to the resistivity ratio $R_h/R_e$ between the environment and the heterogeneity, this first number being followed by a hyphen, then a second number representing distance p between borehole 3 and interface 4, expressed in meters.

As in the geometric configuration shown in FIG. 4, for which a measuring assembly with no focusing means was used to establish the curves of FIG. 6, it is impossible to define the resistivity ratio $R_h/R_e$ when the thickness e of the intercalated bed is unknown.

However, as in FIG. 4, the measured values allow the relationship between resistivity ratio $R_h/R_e$ and thickness e of the intercalated bed to be determined.

It can be seen clearly from FIG. 6, for which the thickness e of the intercalated bed is 1 meter, that a measurement of value $R_a$ related to the resistivity of the formation $R_h$ effected for an emitter-detector distance d greater than 2 meters, allows the resistivity ratio $R_h/R_e$ to be determined, and that when associated with the measurement of the value $R_a$ related to $R_h$ effected for a distance d less than 2 meters, for example 0.5 meter, it gives the distance p between borehole 3 and interface 4. In practice, distance p is not given with respect to one of the two interfaces, but distance p gives the eccentricity of borehole 3 in the intercalated bed.

For values $R_a$ associated with distance d and for values p not appearing in FIG. 6, it is possible to interpolate and/or extrapolate the curves existing for certain values of p and/or to complete the simulation shown in FIG. 6.

The graphic representations of FIGS. 2 and 4 assume, for rapid definition of the resistivity of the heterogeneity and the distance between the borehole and the interface with the heterogeneity, that the resistivity of the environment is already known, something obtained more easily when the borehole passes through this environment.

However, the measured resistivity value related to the resistivity of the heterogeneity can also be represented as a function of the distance d separating the current emitter from the current detector. This would apply for example to the geometric configuration illustrated in FIG. 5. However, in practice, since the borehole intersects environment 1, it is possible to determine its resistivity.

Instead of identifying the borehole and interface of the heterogeneity with a figure such as FIGS. 2, 4, and 6, the evolution in the value measured could be determined by computer as a function of the distance d between the emitter and the detector for various parameters such as $R_h/R_e$, and p, and these parameters could be identified by an appropriate recognition program. Tables of simulated values could also be used in certain configuration cases.

Also, another graphic simulation could be made by returning to the parameters used above, such as $R_a/R_h$, d, p, $R_h/R_e$.

It will be seen that the representations of the curves presented in FIGS. 3, 4, and 6 tend to a horizontal asymptote. These curves approach these asymptotes according to the slopes linked to a greater or lesser $R_h/R_e$ ratio.

Thus one would have to use a very specific emitter-receiver distance to cover the path of the curve and not obtain points close to the asymptot which do not reflect the influence of the heterogeneity. Thus, for carefully chosen emitter-receiver distance values, it would be unnecessary to know in which configuration (FIG. 1, 3, 5) the measurements were made.

Thus, a regular positioning every 10 cm over a length of 10 meters would enable the three cases shown in the figures to be covered.

In the same way, if the distances are properly chosen, only a few points would be required to deduce the superimposition on the theoretical curve.

The method of determining resistivity parameters, such as the resistivity of the environment and/or of the heterogeneity, and determining dimensional parameters, such as the distance between the borehole and the interface of the heterogeneity with the environment, could be transposed to determining parameters of a non-electrical characteristic.

This other characteristic parameter is based on hypotheses essentially similar to those used for determining the resistivities.

Thus, this characteristic parameter, or more generally said application, uses for its definition hypotheses of a point emitter of a field $\vec{X}$ deriving from a potential U, $\vec{X} = -\text{grad } U$, this potential having a value of zero at infinity, this field $\vec{X}$ having an axially symmetric distribution whose axis passes through emitter A and is perpendicular to interface 4, this field also being conservative in space.

(div $\vec{X}$=0 or $\Delta U$=0)

The axially symmetric distribution of field $\vec{X}$ is the consequence of the symmetries of the boundary conditions, of the stratified heterogeneities of the environment and of the type of current injection.

To solve, $\Delta U = 0$, the potential U is expressed in cylindrical coordinates (r, z), with axis OZ being perpendicular to the various beds in the formation and having as its origin the current injection point.

The so-called "separation of variables" method and the "variation of constant" method are then applied to the potential to resolve the laplacian of the potential (in polar coordinates) and give the general solution of the potential.

The complete solution of the potential is given by the general solution and a particular solution characterizing the type of current injection. The boundary conditions, such as zero potential at infinity, continuity of potential at the interfaces, and continuity of normal flow of current density at the interfaces, allow the potential to be expressed for each formation configuration. The expression of the potential and the type of measuring sonde (normal, lateral) allow a characteristic application to be expressed, forming a relationship between the resistivity parameters of the environment and/or of the heterogeneity, the dimensional parameters of the environment and/or of the heterogeneity, the characteristic measured value, and the associated emitter-detector distance and/or combinations of these parameters.

It is known to the individual skilled in the art that $\Delta U = 0$ can be solved for certain geological configurations, and the methods used are described for example in the articles:

"Potential Electrical Distribution Around a Sample of Rock in Terrain With Horizontal Homogeneous and Isotropic Beds," Stefano, S.S., *Journal de Physique et du Radium*, 1930, Series 7, pages 132–140, and "The Application of Linear Filter Theory to the Direct Interpretation of Geoelectrical Resistivity Sounding Measurement," Gosh, D.P., *Geophysical Prospecting*, 1971, 19, pages 192–217.

This other field may be, for example, a magnetic filed such as a constant magnetic field.

When the characteristic parameter is for example resistivity, voltage, or electric current, the transposed parameter must be analogous to the initial parameter.

In general, after transposition, the apparent resistivity is called the measured value of the characteristic (for a given emitter-detector distance), the resistivity of the environment is called the characteristic parameter of the environment, the resistivity of the heterogeneity is called the characteristic parameter of the heterogeneity.

In the examples of application of the method, described above, the curves are parametrized as a function of the distance p between the borehole 3 and the interface 4 between the environment and the heterogeneity. When the geological configurations of the environment and the heterogeneity are different, the distance p may be defined differently, and other dimensional parameters may be detected by the measurements made. Hence, the borehole-interface distance will also be called a dimensional parameter.

In the application examples of the method, described above, one simulates the evolution of an application depending on the measurable value of the characteristic, the emitter-detector distance, the dimensional parameter p of the environment, characteristics parameters of the environment and the heterogeneity as a function of the measurable value related to the characteristic parameter of the environment and the emitter-detector distance for variable quantities of the characteristic parameter of the environment related to the characteristic parameter of the heterogeneity and variable quantities of the dimensional parameter.

The relationships binding two parameters together, for example the relation between the characteristic parameters of the environment and the heterogeneity or the relation between the measurable value and the characteristic parameter of the environment, are termed a combined parameter of several parameters. It will not be a departure from the invention to combine parameters by such relationships and express said application with combined parameters. Likewise, the axes of the graphic representations may have other combined parameters.

To obtain different measurements of the apparent resistivity value, one may either use a current emitter and detector with a variable spacing, or a plurality of current emitters and detectors made to operate in such a way that the gap between the emitter and detector in action is variable.

The characteristic parameter of the environment or the heterogeneity, such as their resistivity, may be measured by means of instruments lowered into the borehole, possibly with the measuring assembly comprising emitter(s) and detector(s).

FIG. 7 shows a non-limitative example of a measuring assembly 10 which allows implementation of the method according to the invention which applies to determination of electrical parameters such as resistivity.

The measuring assembly is disposed in a borehole located in an underground geological formation 5 which is to be explored, in particular by the method according to the invention, from the surface of the ground by means of a well.

This measuring assembly has a plurality of electrodes 11 and 12 separated from each other by an electrically insulating and stiff material which may advantageously be a composite material such as glass fibers embedded in epoxy resin. These electrodes are for example annular and coaxial with the measuring assembly. These electrodes 11 and 12 include a current-emitting electrode 12 and current-detecting electrodes 11. The current-emitting electrode 12 is connected to a current generator, the detecting electrodes or detectors are connected to a multiplexing device 13 or resistivity device which collects the measured current or voltage information and communicates it to the surface of the ground by a single measuring link.

The current furnished by emitter 12 is not focused, as is done with certain types of electrical well logging such as those performed by the Laterolog (trademark registered by Schlumberger), but it would not be a departure from the invention to use one or more focused emitters.

Detectors 11 are disposed in such a way that their distances from emitter 12 are not constant. According to the type of geometric arrangement of the heterogeneity and the environment, and thanks to the insulating separating materials that may be used, such as glass fiber sleeves 14, the distances separating the detectors from the emitter can be adjusted by appropriate extensions.

The measuring assembly also has an insulating extension 15 which, for example when it is lowered into a well by means of a pipe 16, allows said pipe to be isolated, and thus avoids electrical perturbations (return to pipe) which would distort the measurements.

Depending on the size of the heterogeneities and their arrangement in the geological formations and with respect to the borehole, very long sleeves might be used, giving a total assembly length of about 150 meters.

Instead of having a single emitter and several detectors, one may use one detector and several emitters disposed such that their distances from the detector are variable.

Advantageously, there could be a very large number of detectors such that the correct measurements for determining parameters such as those mentioned in the above-described method could be selected.

The measurement assembly could include an additional emitter and/or a detector, for example a focusing emitter, to measure the resistivity of the environment or the heterogeneity in which the measuring assembly was located.

FIG. 8 illustrates a non-limitative embodiment of a device having a measuring assembly according to the invention. Measuring assembly 10 is lowered into well 20 by means of pipe 21 to which said assembly 10 is connected by an extension 15 and a base 22. During the descent, measuring assembly 10 is located in a protective housing 23. It would not be a departure from the invention to eliminate this protective housing. At the end of the descent of the measuring assembly and pipe, an electric connector 24 connected by a cable 25 to surface equipment 33 above the ground and fitted with a loading bar is lowered into pipe 21 by pumping for example. This connector becomes anchored to base 22 and cooperates with an electrical plug 26 matching the connector and connected to said measuring assembly.

When the connector 24 has been plugged into plug 26 and base 22, base 22, which is initially held by catches 27, whose action is remotely cancellable, may be lowered until it abuts shoulder 28 in a position suitable for assembly 10 to perform its measuring work.

For pumping of connector 24, the upper end of pipe 21 is provided with a stuffing box 29 through which cable 25 passes to return pulleys 30 and take-up winch 31 from which the cable is connected to equipment 33. The upper end of the pipe 21 is also provided with a duct 32 connected to pumping equipment which allows connector 24 to move.

When it is desired to set up several measuring stations in a borehole, a connector with a lateral window (usually known as a side entry sub-SES) may be used, as described for example in French Patent Nos. 2,501,777, 2,522,059, 2,564,893, and 2,547,861.

When the diameter of the borehole is large by comparison with the outside diameter of the electrodes of the emitter and the detector, particularly when the drilling mud is particularly conductive, a sonde enlarger such as that described in French patent application EN No. 87/02 757 may be used.

What is claimed is:

1. A method of exploring for inverse deposits in a geological environment having an electrical resistivity $R_h$, with a heterogeneity in the environment having an electrical resistivity $R_e$, one of the electrical resistivities $R_h$ and $R_e$ having a known value and the other of the electrical resistivities $R_h$ and $R_e$ having an unknown value, and with a borehole extending into one of the environment and the heterogeneity at an unknown distance p from an interface of the environment and the heterogeneity, said method comprising the steps of:
    (a) extending into the borehole a measuring assembly having an electrical emitter and a plurality of electrical detectors disposed at increasing distances from the emitter;
    (b) applying electrical energy to the emitter and detecting the electrical energy with at least one of the detectors, said at least one of the detectors being located at an average distance d from the emitter;
    (c) from the transmitted and detected electrical energies, determining an electrical resistivity $R_a$ for the borehole at the emitter-detector distance d;
    (d) repeating steps (b) and (c) for different ones of the detectors;
    (e) for each value of $R_a$ determined as a result of steps (b), (c), and (d), determining the ratio R between resistivity $R_a$ and the known one of the resistivities $R_h$ and $R_e$;
    (f) plotting a curve of the resistivity ratio R as a function of the distance d;
    (g) comparing the plotted curve with previously obtained curves of the resistivity ratio R as a function of the distance d for at least one combination of the values of the ratio $R_h/R_e$ and the borehole-interface distance p;
    (h) determining from the comparison a resistivity ratio $R_h/R_e$ and a borehole-interface distance p for the plotted curve;
    (i) calculating the unknown one of the resistivities $R_h$ and $R_e$; and
    (j) drilling the borehole in a direction determined on the basis of the resistivities.

2. A method as claimed in claim 1 wherein step (g) comprises comparing the plotted curve with previously obtained curves of the resistivity ratio $R_a/R_h$ as a function of the distance d for a constant resistivity ratio $R_h/R_e$ and for various values of the distances p.

3. A method as claimed in claim 1 wherein step (g) comprises comparing the plotted curve with previously obtained curves of the resistivity ratio $R_a/R_h$ as a function of the distance d for various values of the resistivity ratio $R_h/R_e$ and for a constant distance p.

4. A method as claimed in claim 1 wherein step (g) comprises superimposing one of the plotted curve and the previously obtained curves on the other thereof.

5. A method as claimed in claim 4 wherein the superimposing comprises superimposing a transparency of the previously obtained curves over the plotted curve.

6. A method as claimed in claim 1 wherein the borehole extends into the environment.

7. A method as claimed in claim 1 wherein the borehold extends into the heterogeneity.

8. A method as claimed in claim 1 wherein step (b) comprises applying electrical energy to the emitter and detecting the electrical energy with two detectors.

9. A method as claimed in claim 1 wherein the electrical resistivity $R_h$ is known and the electrical resistivity $R_e$ is unknown.

10. A method as claimed in claim 1 wherein the electrical resistivity $R_h$ is unknown and the electrical resistivity $R_e$ is known.

11. A method as claimed in claim 10 wherein step (g) comprises comparing the plotted curve with previously obtained curves of the resistivity ratio $R_a/R_e$ as a function of the distance d for a constant resistivity ratio $R_h/R_e$ and for various values of the distances p.

12. A method as claimed in claim 10 wherein step (g) comprises comparing the plotted curve with previously obtained curves of the resistivity ratio $R_a/R_e$ as a functionn of the distance d for various values of the resistivity ratio $R_h/R_e$ and for a constant distance p.

* * * * *